United States Patent
Iwasaki et al.

(10) Patent No.: US 6,867,945 B2
(45) Date of Patent: Mar. 15, 2005

(54) CASSETTE LOADING DEVICE

(75) Inventors: Keishi Iwasaki, Osaka (JP); Akio Konishi, Hyogo (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 108 days.

(21) Appl. No.: 10/159,740

(22) Filed: May 31, 2002

(65) Prior Publication Data

US 2002/0196579 A1 Dec. 26, 2002

(30) Foreign Application Priority Data

Jun. 25, 2001 (JP) ........................................ 2001-190989

(51) Int. Cl.[7] .......................................... G11B 15/675
(52) U.S. Cl. ........................................................ 360/96.5
(58) Field of Search ............................................ 360/96.5

(56) References Cited

U.S. PATENT DOCUMENTS

| | | | | |
|---|---|---|---|---|
| 6,038,100 A | * | 3/2000 | Nagatsuka | 360/96.6 |
| 6,072,658 A | * | 6/2000 | Kumagai | 360/96.5 |
| 6,115,209 A | * | 9/2000 | Araki et al. | 360/96.5 |
| 6,198,596 B1 | * | 3/2001 | Kumagai et al. | 360/96.5 |
| 2001/0012173 A1 | * | 8/2001 | Kumagai | 360/96.5 |

* cited by examiner

*Primary Examiner*—A. J. Heinz
*Assistant Examiner*—Mark Blouin
(74) *Attorney, Agent, or Firm*—Renner, Otto, Boisselle & Sklar, LLP (57) ABSTRACT

A cassette loading device of the present invention includes: a holder for retaining a cassette therein, the holder reciprocating between a first holder position for insertion of the cassette into the holder and a second holder position for loading the cassette into a body; and a main arm including: a first main arm engagement member provided at one end of the main arm for engagement with a first holder engagement member provided at a near side of a side face of the holder such that the main arm is rotatable about the first holder engagement member; and a second main arm engagement member provided at another end of the main arm for engagement with a second body engagement member provided at a far side of the body such that the main arm is slidable along the second body engagement member.

4 Claims, 8 Drawing Sheets

CASSETTE LOADING DEVICE

BACKGROUND OF THE INVENTION

1. Field of the Invention

The present invention relates to a cassette loading device used for a magnetic recording/reproducing apparatus.

2. Description of the Related Art

Recently, among magnetic recording/reproducing apparatuses, videotape camera-recorders are becoming less expensive. Videotape camera-recorders, for example, include a cassette loading device for loading a cassette into the recorder.

A conventional cassette loading device will now be described below.

Figure 8A:
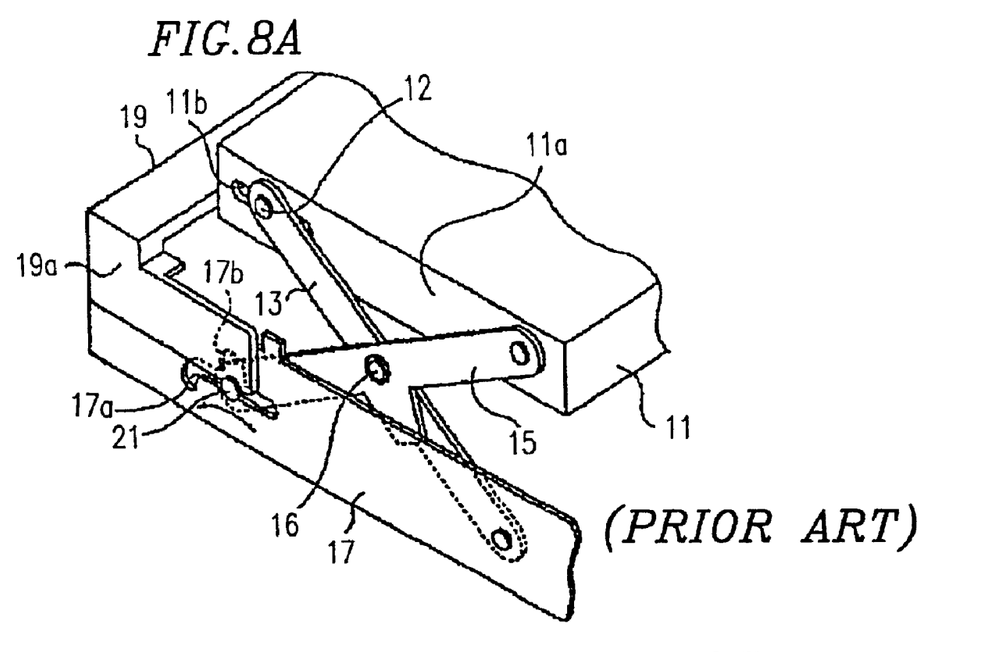
FIG. 8A is a perspective view showing a portion of a conventional cassette loading device.
Figure 8B:
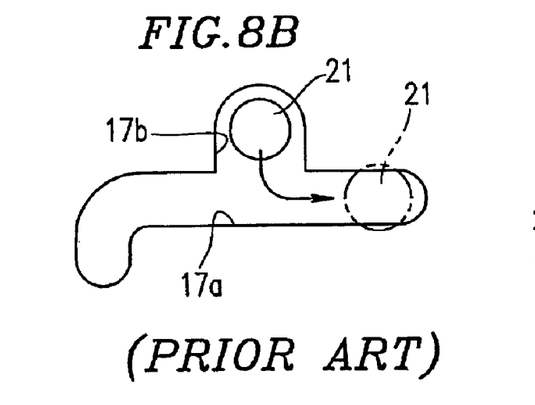
FIG. 8B is a side view for explaining an insertion direction of a support pin 21 of the conventional cassette loading device of FIG. 8A.
Figure 8C:
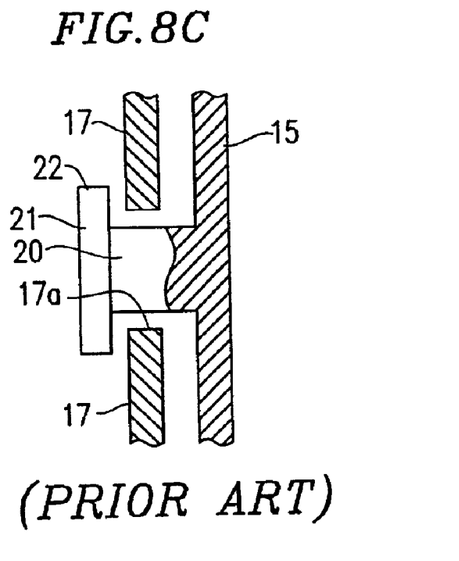
FIG. 8C is a cross-sectional view of the support pin 21 of FIG. 8A.

A conventional cassette loading device is disclosed in Japanese Laid-Open Patent Publication No. 11-213490, as shown in FIGS. 8A–8C which illustrate specific portions of the conventional cassette loading device. Although the aforementioned Patent Publication uses member names such as a "boss 20", a "support pin (flange) 21", and a "pin hole 17b", these members are respectively referred to herein as a "support pin boss 20", a "support pin 21", and a "pin insertion hole 17b" and, as shown in FIG. 8C, reference numeral 22 is also used to denote a "support pin flange".

FIG. 8A is a perspective view showing a portion of the conventional cassette loading device. FIG. 8B is a side view for explaining an insertion direction of the support pin 21. FIG. 8C is a cross-sectional view of the support pin 21. In FIG. 8A, the conventional cassette loading device includes a cassette holder 11 which receives a cassette (not shown). The cassette holder 11 has a flat box-like structure and receives a cassette from the right side of FIG. 8A.

The cassette holder 11 can be moved up and down whilst being kept horizontal by a holder retention mechanism including two pairs of arms 13 and 15. In FIG. 8A, although only one arm of each of the pair of arms 13 and 15 is shown, the other arm of the pair of arms 13 and 15 is provided on the opposite side of the cassette holder 11. The arms 13 and 15 are pivotably supported by a support pin 16. One end of the arms 13 and 15 is pivotably attached to a chassis sidewall 17 and a holder sidewall 11a, respectively. The other end of the arms 13 and 15 is supported by support pins 12 and 21 so as to be in communication with the holder sidewall 11a and the chassis sidewall 17, respectively. Specifically, the support pins 12 and 21 are respectively engaged with a slot 11b provided in the holder sidewall 11a and a slot 17a provided in the chassis sidewall 17 in a slidable manner.

The slot 17a extends along a longitudinal direction of the chassis sidewall 17. As shown in FIG. 8B, the pin insertion hole 17b is provided at the center of the upper side of the slot 17a, such that the slot 17a and the pin insertion hole 17b are connected. The pin insertion hole 17b is large enough to allow the support pin flange 22 to pass therethrough. On the other hand, a width of the slot 17a excluding the pin insertion hole 17b is narrower than a diameter of the support pin flange 22. As shown in FIG. 8C, the support pin boss 20 of the arm 15 is narrower than the width of the slot 17a and is engaged with the slot 17a so as to be slidable along the longitudinal direction of the slot 17a.

Thus, as shown in FIG. 8B, when aligning the support pin 21 with the pin insertion hole 17b and pushing the arm 15 in a direction normal to the sheet of FIG. 8B, the support pin flange 22 passes through the pin insertion hole 17b so that the support pin flange 22 is external to the chassis sidewall 17. Thereafter, as shown in FIG. 8C, by moving the support pin 21 downward and transversely along the slot 17, the support pin boss 20 is engaged with the slot 17a.

In a subsequent step of assembly of the conventional cassette loading device, as shown in FIG. 8A, the pin insertion hole 17b is covered by a frame 19a of a cassette slip prevention element 19. This prevents the support pin 21 from being disengaged from the slot 17a during operation when the cassette holder 11 is moved up and down.

However, in the above conventional structure, the following problems described below occur.

When the support pin flange 22 is positioned at the end of the slot 17a shown in FIG. 8B by a dashed circle, the cassette holder 11 is in an uppermost position of its moving range. When the pin flange 22 is positioned at the other end of the slot 17a, the cassette holder 11 is in a lowermost position of its moving range.

Accordingly, in order to assemble the cassette loading device with the chassis sidewall 17, it is necessary to align the support pin 21 with the pin insertion hole 17b while keeping the cassette holder 11 in a suitable position between the uppermost and lowermost positions of its moving range. This results in the assembly of the conventional cassette loading device being difficult and time-consuming.

Moreover, after the support pin 21 has been inserted into the slot 17a via the pin insertion hole 17b, a cover member is required to cover the pin insertion hole 17b so as to prevent the support pin 21 from being disengaged from the slot 17a during operation, e.g., the frame 19a of the cassette slip prevention element 19. As a result, the number of parts used for the conventional cassette loading device is increased.

SUMMARY OF THE INVENTION

According to one aspect of the present invention, there is provided a cassette loading device including: a holder for retaining a cassette therein, the holder reciprocating between a first holder position for insertion of the cassette into the holder and a second holder position for loading the cassette into a body; a main arm including: a first main arm engagement member provided at one end of the main arm for engagement with a first holder engagement member provided at a near side of a side face of the holder such that the main arm is rotatable about the first holder engagement member; and a second main arm engagement member provided at another end of the main arm for engagement with a second body engagement member provided at a far side of the body such that the main arm is slidable along the second body engagement member; and a subarm including: a first subarm engagement member provided at one end of the subarm for engagement with a first body engagement member provided at a near side of the body such that the subarm is rotatable about the first body engagement member; and a second subarm engagement member provided at another end of the subarm for engagement with a second holder engagement member provided at a far side of the side face of the holder such that the subarm is slidable along the second holder engagement member, the subarm being supported at a rotation center thereof so as to be rotatable with respect to a rotation center on the main arm, wherein the subarm is elastically deformable so that the first subarm engagement member is moved along a direction of a rotation center axis of the subarm and the first subarm engagement member to be disengaged from the first body engagement member.

In one embodiment of this invention, the first body engagement member has an inclined surface along which the first subarm engagement member is slidable so as to elastically deform the subarm during partial engagement of the first subarm engagement member with first body engagement member.

In another embodiment of this invention, the subarm further includes a guide member and the body further includes a slit for accommodating the guide member when the first subarm engagement member is at least partially engaged with the first body engagement member.

In still another embodiment of this invention, the second body engagement member includes a first portion and a second portion, and the second main arm engagement member includes a flange, the diameter of the flange being larger than a width of the first portion of the second body engagement member and smaller than a diameter of the second portion of the second body engagement member.

Thus, the invention described herein makes possible the advantages of providing a cassette loading device which can be readily and easily assembled and which uses a small number of parts.

These and other advantages of the present invention will become apparent to those skilled in the art upon reading and understanding the following detailed description with reference to the accompanying figures.

DESCRIPTION OF THE EMBODIMENTS

A cassette loading device according to the present invention includes: a holder for retaining a cassette therein, the holder reciprocating between a first holder position for insertion of the cassette (e.g., a cassette including a (magnetic) tape therein) into the holder and a second holder position for loading the cassette into a body (e.g., the body of a magnetic recording/reproducing apparatus); a main arm including a first main arm engagement member provided at one end of the main arm for engagement with a first holder engagement member provided at a near side of a side face of the holder such that the main arm is rotatable about the first holder engagement member, and a second main arm engagement member provided at another end of the main arm for engagement with a second body engagement member provided at a far side of the body such that the main arm is slidable along the second body engagement member; and a subarm including a first subarm engagement member provided at one end of the subarm for engagement with a first body engagement member provided at a near side of the body such that the subarm is rotatable about the first body engagement member, and a second subarm engagement member provided at another end of the subarm for engagement with a second holder engagement member provided at a far side of the side face of the holder such that the subarm is slidable along the second holder engagement member.

The subarm is supported at a rotation center thereof so as to be rotatable with respect to a rotation center on the main arm. The first subarm engagement member is elastically deformed so that the first subarm engagement member is moved along a direction of a rotation center axis of the subarm so that the first subarm engagement member is disengaged from the first body engagement member. Thus, there is no need for keeping the holder in a suitable position between uppermost and lowermost positions of its moving range in order to assemble the holder with the body, thereby facilitating easy assembly.

Since the first subarm engagement member is not disengaged from the first body engagement member after the assembly, there is no need for covering a hole used for the assembly as is conventional, thereby reducing the number of parts used for the cassette loading device.

Hereinafter, examples of the present invention will be described with reference to FIGS. 1 through 7.

EXAMPLE 1

Figure 1:
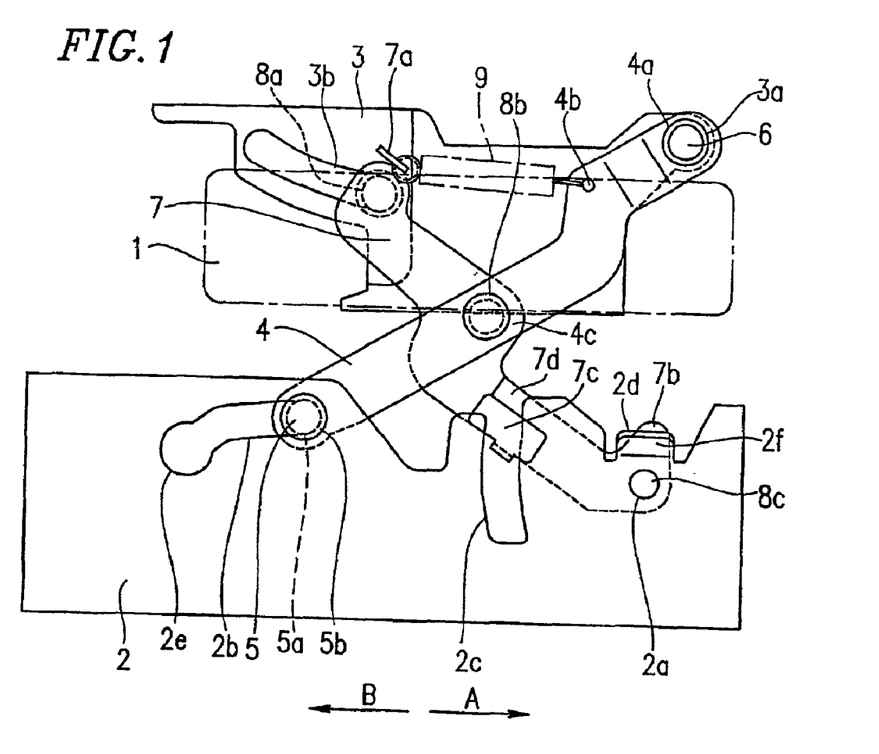
FIG. 1 is a left side view of a cassette loading device according to the present invention after assembly.
Figure 2:
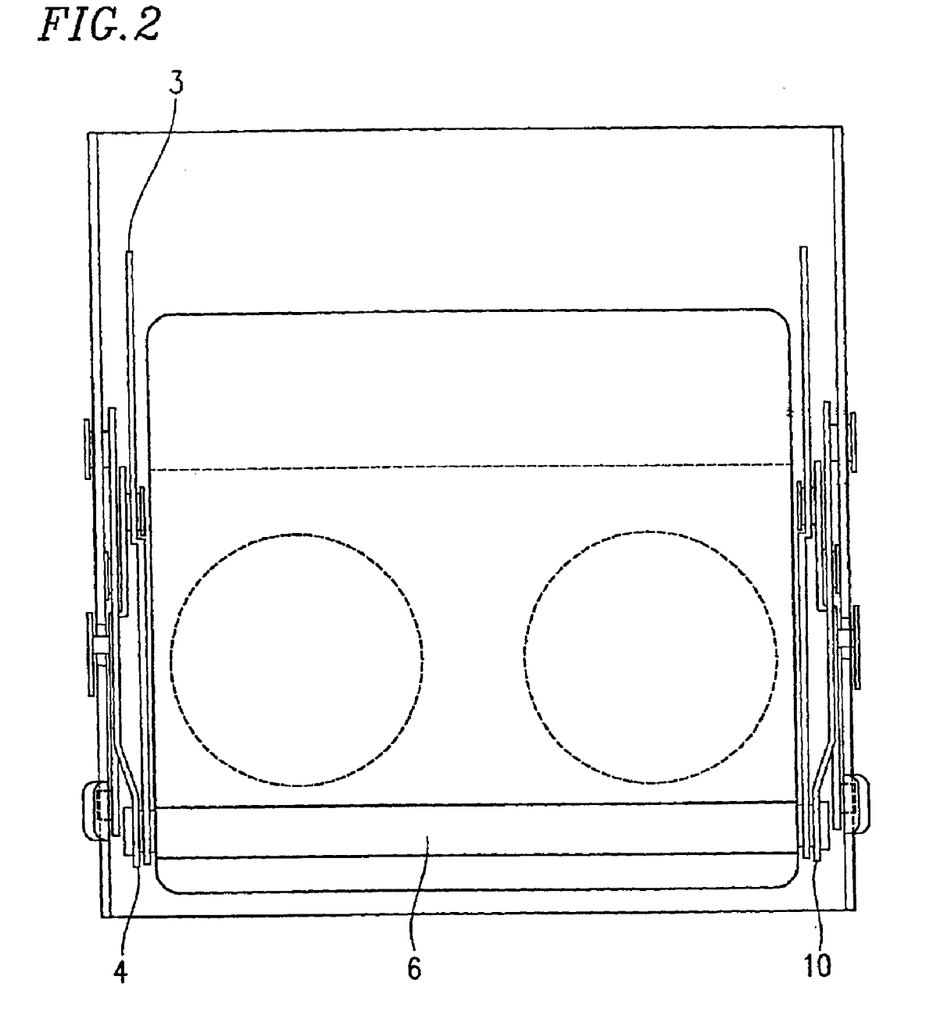
FIG. 2 is a top view of the cassette loading device of FIG. 1.
Figure 3:
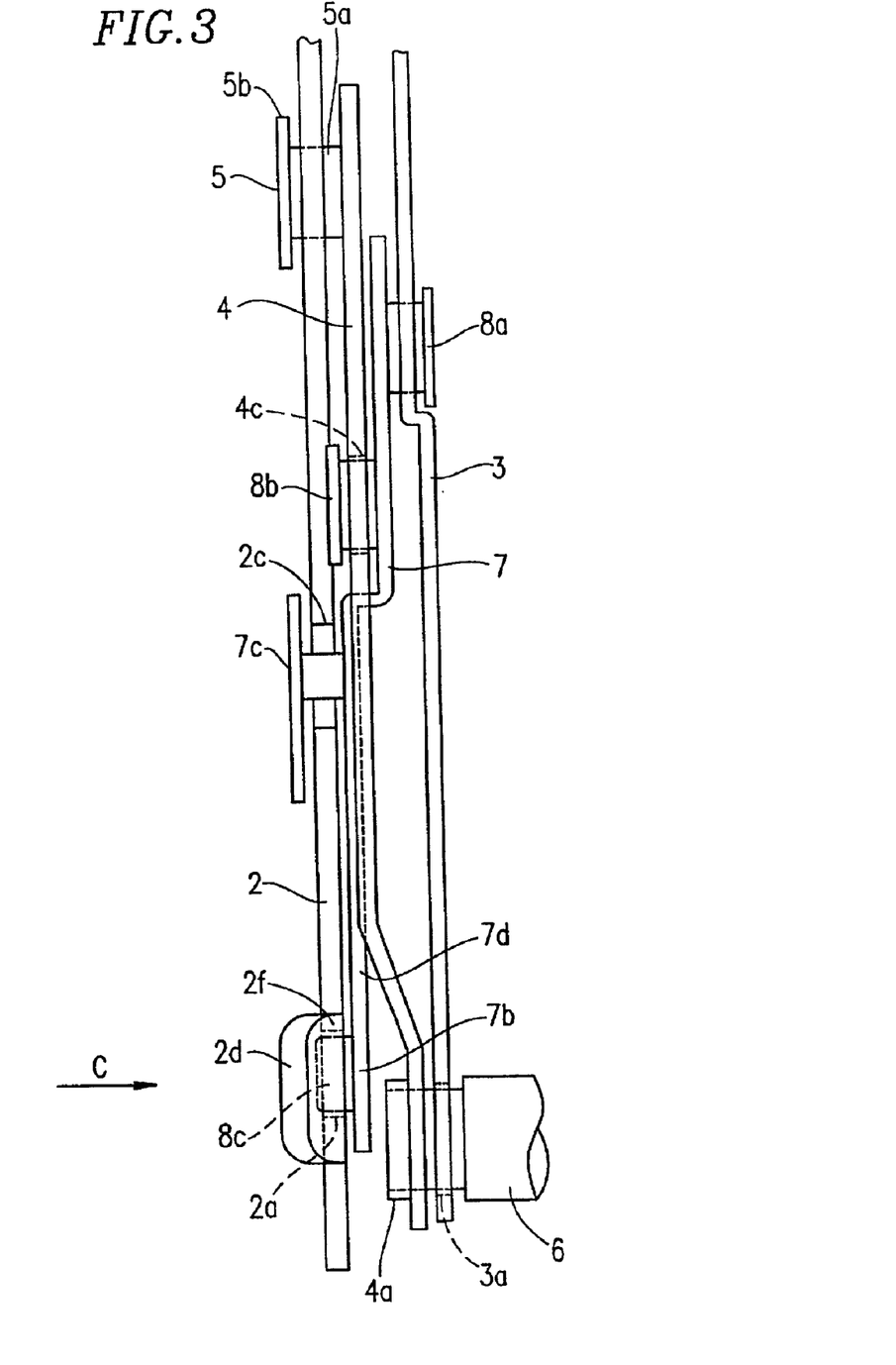
FIG. 3 is a magnified top view showing a primary part of the cassette loading device of FIG. 1.
Figure 4:
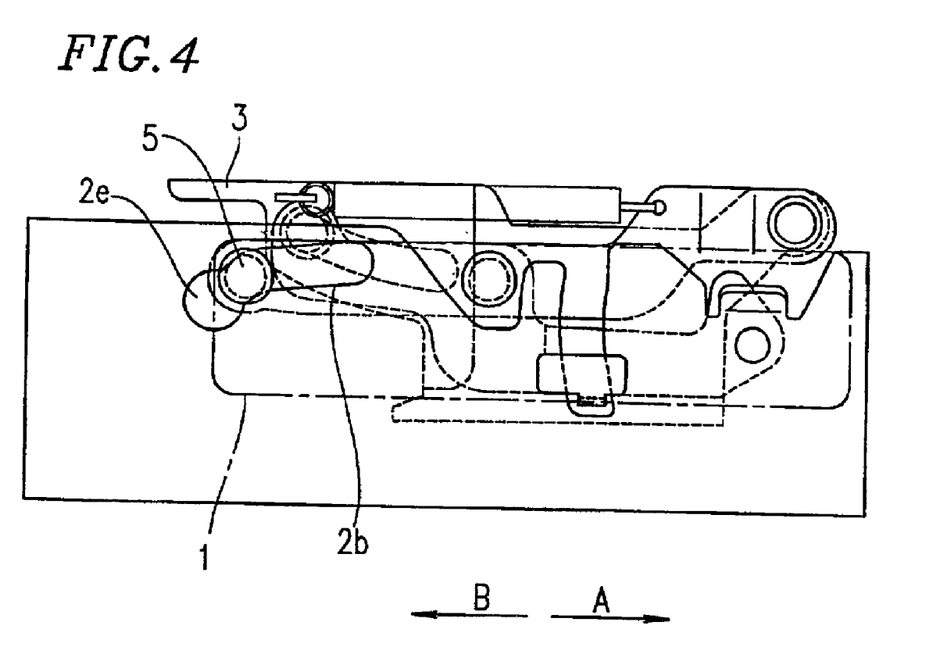
FIG. 4 is another left side view of the cassette loading device of FIG. 1.

FIG. 1 is a left side view of a cassette loading device according to the present invention after assembly. The cassette loading device shown in FIG. 1 is in a state where a user can insert or remove a cassette to or from the body of the cassette loading device. FIG. 2 is a top view of the cassette loading device of FIG. 1. FIG. 3 is a magnified top view showing a primary part of the cassette loading device of FIG. 1. FIG. 4 is another left side view of the cassette loading device of FIG. 1. The cassette loading device shown in FIG. 4 is in a state where a cassette has been loaded into the body of the magnetic recording/reproducing apparatus.

Although the cassette loading device of the present invention will be described with respect to the left side thereof, the cassette loading device has the same structure on the right side thereof. In the following description, a "near side" refers to a first position in a direction shown with arrow A in FIGS. 1, 4, 5 and 6, and a "far side" refers to a second position in a direction shown with arrow B in the same figures.

In FIGS. 1 through 3, reference numerals 1, 2 and 3 respectively denote a cassette including a (magnetic) tape, a body sidewall of a body of a magnetic recording/reproducing apparatus, and a holder. The body sidewall 2 includes a body support hole 2a (first body engagement member), a body slot 2b (second body engagement member), a guide slit 2c, and a receiving portion 2d. The body slot 2b includes an enlarged hole 2e on its far side. The receiving portion 2d includes an inclined face 2f on the back side thereof (corresponding to the reverse side of the sheet of FIG. 1). The holder 3 retains the cassette 1 therein and includes a holder support hole 3a (first holder engagement member) and a holder slot 3b (second holder engagement member). Although a ceiling portion or the like, which defines an uppermost position of the cassette loading device, is located above the holder 3, such a portion is omitted in the drawings for clarity of illustration.

Reference numeral 4 denotes a main arm which includes: a first main arm support hole 4a (first main arm engagement member) and a spring hanger hole 4b at the near side; a second main arm support hole 4c substantially at the center of the main arm 4; and a main arm pin 5 -(second main arm engagement member) at the far side. The main arm pin 5 is engaged with the body slot 2b in a slidable manner. As shown in FIG. 3, the main arm pin 5 includes a base 5a and a flange 5b having a diameter larger than that of the base 5a. A slot width of the body slot 2b is larger than the diameter of the base 5a and smaller than the diameter of the flange 5b. The enlarged hole 2e has a diameter larger than that of the flange 5b. Thus, the main arm pin 5 is not disengaged from the body slot 2b unless it is positioned in the enlarged hole 2e.

Reference numeral 6 denotes a synchronous shaft which is positioned in the first main arm support hole 4a and is fixed so as not to be rotated with respect to the main arm 4. The synchronous shaft 6 is also positioned in a support hole in a main arm 10 (shown in FIG. 2) provided on the other side (right side view) of the body and is fixed in a similar manner. The synchronous shaft 6 passes through the holder support hole 3a and is supported with respect to the holder 3 in a rotatable manner. Accordingly, when the main arm 4 on the left side of the body is rotated, the main arm 10 is also rotated at the same angle as the rotation angle of the main arm 4, thereby ensuring that the left and right holder retention mechanisms move in synchronization with each other.

Reference numeral 7 denotes a subarm which includes: a first subarm pin 8a (second subarm engagement member) and a spring hanger 7a at the far side; a second subarm pin 8b substantially at the center of the subarm 7; and a third subarm pin 8c (first subarm engagement member) and a press portion 7b on the near side. The first subarm pin 8a is engaged with the holder slot 3b in a slidable manner. The second subarm pin 8b is engaged with the second main arm support hole 4c in a rotatable manner. The third subarm pin 8c is engaged with the body support hole 2a in a rotatable manner. The subarm 7 has a guide 7c and a near side portion 7d. The body sidewall 2 is sandwiched between the near side portion 7d and the guide 7c. The subarm 7 can be elastically deformed in a direction normal to the elongated length thereof about the rotation center thereof.

Reference numeral 9 denotes a spring having one end joined to the spring hanger 7a and another end joined to the spring hanger hole 4b so as to be connected between the main arm 4 and the subarm 7.

The advantage effects of the cassette loading device structured in the above-described manner according to the present invention will now be described.

Referring to FIG. 1, the holder 3 is retained by the main arm 4 and the subarm 7 so as to move up and down. Motion trajectories of the main arm 4 and the subarm 7 cause the holder 3 to be maintained in a substantially horizontal manner in relation to the body even when the holder 3 is moved up and down. The spring 9 biases the main arm 4 so as to be rotated counterclockwise and also biases the subarm 7 so as to be rotated clockwise, so that the holder 3 is always biased so as to move upward (i.e., away from the body), when it is desired to move the holder from the lowermost position thereof.

In FIG. 1, the holder 3 is in an uppermost position of its moving range. In this state, a user can insert the cassette 1 into the holder 3 and remove the cassette 1 from the holder 3. In FIG. 4, the holder 3 is in a lowermost position of its moving range. In this state, the cassette 1 is loaded into the body, such that the tape in the cassette 1 is in a recordable and reproduceable state. It should be noted that none of the drawings show a lock mechanism for retaining the cassette loading device in the state shown in FIG. 4, however such lock mechanisms are known.

Referring to FIG. 2, when the main arm 4 on the left side of the body is rotated, the main arm 10 on the right side of the body, which is connected to the main arm 4 via the synchronous shaft 6, is also rotated at the same angle as the rotation angle of the main arm 4, thereby ensuring that the left and right mechanisms move in synchronization with each other. That is, the holder 3 can move up and down while in a substantially horizontal manner with respect to the body such that neither the right nor left sides of the holder is at a level substantially higher than the other side.

Figure 5:
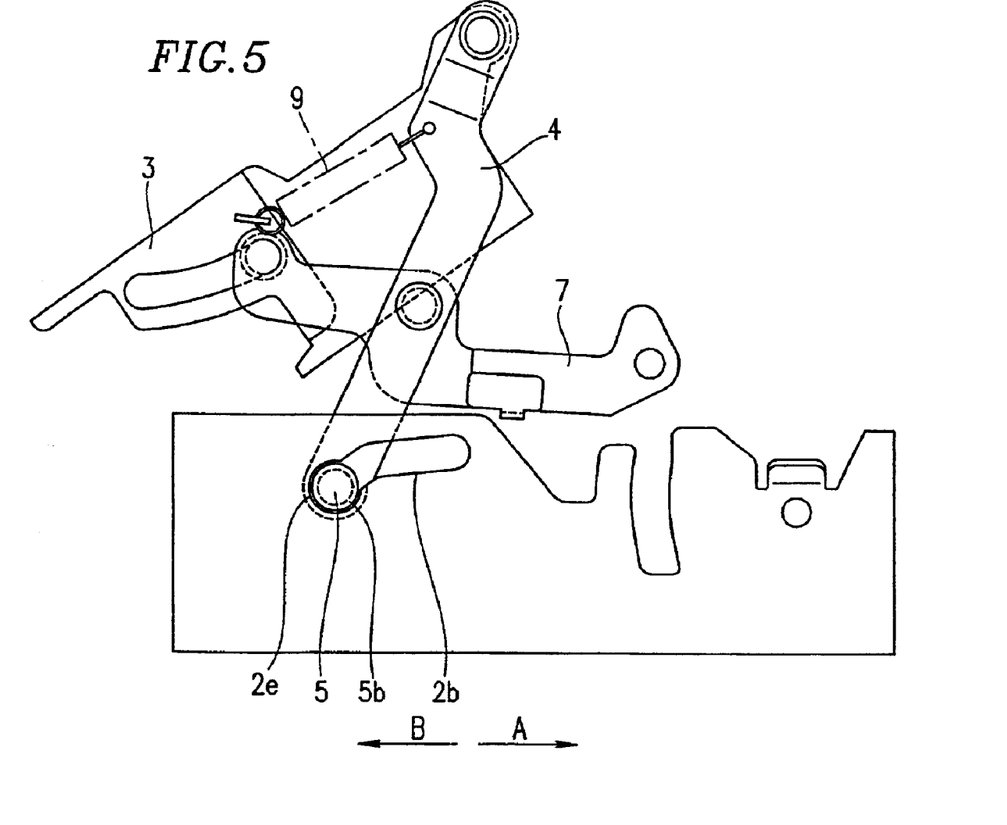
FIG. 5 is a left side view of the cassette loading device according to the present invention during assembly.
Figure 6:
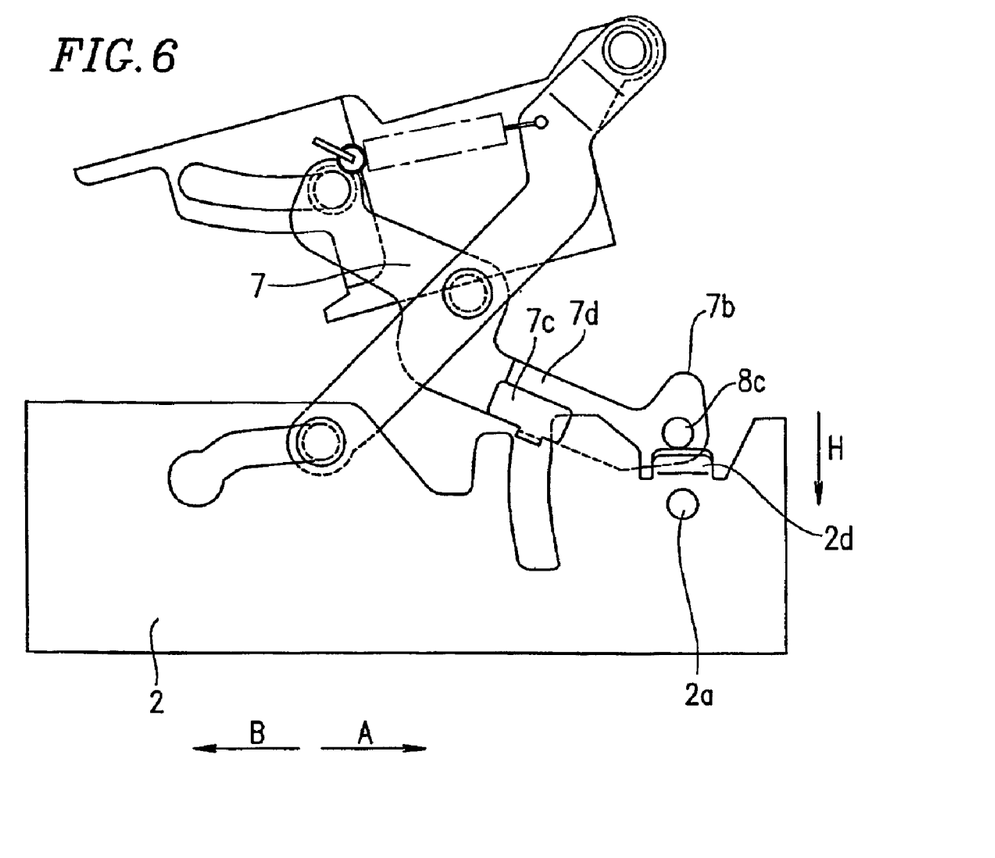
FIG. 6 is another left side view of the cassette loading device according to the present invention during assembly.
Figure 7:
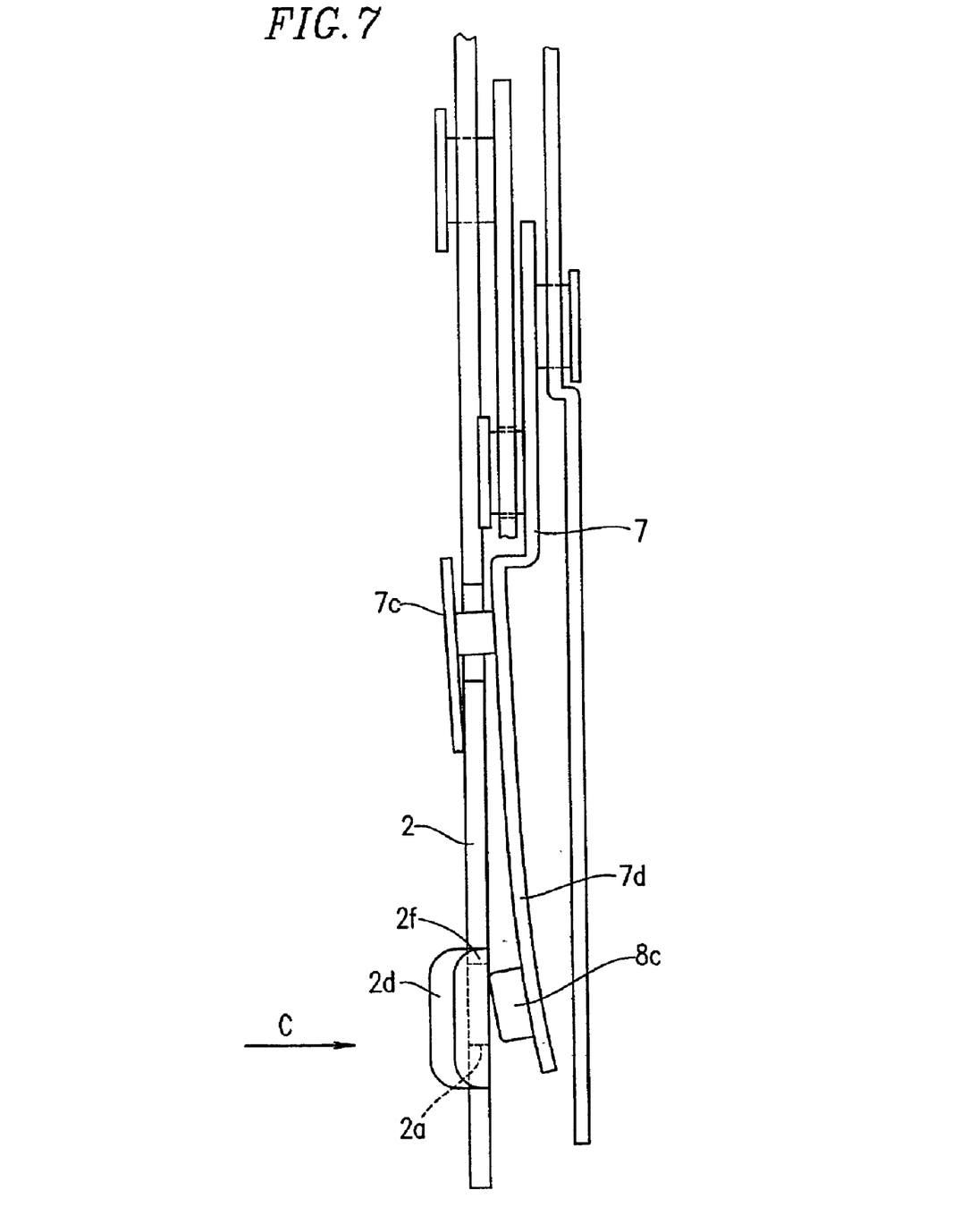
FIG. 7 is a magnified top view showing a primary part of the cassette loading device according to the present invention during assembly.

Next, a procedure of assembling the cassette loading device with the body of the magnetic recording/reproducing apparatus is described. FIGS. 5 and 6 respectively illustrate a left side view of the cassette loading device according to the present invention during different steps of assembly. FIG. 7 is a magnified top view showing a primary part of the cassette loading device during assembly. First, as shown in FIG. 5, the holder 3, the main arm 4, and the subarm 7 are in their respective uppermost positions of a range of being moved by the spring 9. In this case, the spring 9 is also in its uppermost position of its moving range. In this state, the arm pin 5 is aligned with the enlarged hole 2e in the body slot 2b, and the flange 5b of the main arm pin 5 is passed through the enlarged hole 2e in a normal direction from the reverse of the sheet of FIG. 5 to the front face of the sheet. This is also done for the right side of the cassette loading device and body of the magnetic recording/reproducing apparatus.

Then, by sliding the main arm pin 5 to the near side of the body slot 2b, it is possible to engage the main arm pin 5 with the body slot 2b. The cassette loading device is rotated clockwise about a pivot provided by the main arm pin 5 such that the cassette loading device is shifted to a position shown in FIG. 6. In this position, the body sidewall 2 is sandwiched between the near side portion 7d and the guide 7c of the subarm 7, and the third subarm pin 8c is forced to come into contact with the receiving portion 2d of the body.

Next, as shown in FIG. 7, by pressing the press portion 7b along a direction shown by arrow H in FIG. 6, the third pin 8c is moved so as to slide on the inclined face 2f of the receiving portion 2d. In this case, as shown in FIG. 7, although the subarm 7 is made to move along a direction shown by arrow C, the subarm 7 is not allowed to move since the right side of the guide 7a is forced to come into contact with the left side surface of the body sidewall 2. As a result of this, the near side portion 7d of the subarm 7 is elastically deformed, and the third subarm pin 8c is moved along the direction shown by arrow C by sliding along the inclined surface 2f so as to provide partial engagement of the third subarm pin 8c and the body, in which state the guide 7c is at least partially accommodated in the guide slot 2c of the body. That is, the third subarm pin 8c is moved along a direction of a rotation center axis of the subarm 7.

In this state, by further moving the cassette loading device clockwise, the third subarm pin 8c is aligned with the body support hole 2a, as shown in FIG. 3, where the elastically-deformed subarm 7 returns to its original state. This causes the subarm third pin 8c to fit into the body support hole 2a, thereby being engaged with the body support hole 2a.

Now, the cassette loading device has been assembled with the body sidewall 2. FIG. 1 illustrates complete assemblage of the cassette loading device assembled with body sidewall 2. As can be readily appreciated from FIGS. 1 and 4, the main arm pin 5 never moves to a position of the enlarged hole 2e over a moving range of the cassette loading device. Accordingly, after assembly, the main arm pin 5 is not disengaged from the body slot 2b. Thus, it is not necessary to cover the large hole 2e, of the body slot 2b to maintain engagement of the main arm pin 5 with the body slot 2b during operation of the cassette loading device of the present invention.

In ordinary use of the cassette loading device, there is no force applied to the near side portion 7d of the subarm 7 along the arrow C direction shown in FIG. 3, and thus the third subarm pin 8c is never disengaged from the body support hole 2a unless such force is intentionally applied to the near side portion 7d so as to intentionally disassemble the cassette loading device from the body of the magnetic recording/reproducing apparatus.

As described above, a cassette loading device according to the present invention includes: a holder for retaining a cassette therein, the holder reciprocating between a first holder position for insertion of the cassette (e.g., a cassette including a (magnetic) tape therein) into the holder and a second holder position for loading the cassette into a body (e.g., the body of a magnetic recording/reproducing apparatus); a main arm including a first main arm engagement member provided at one end of the main arm for engagement with a first holder engagement member provided at a first position of a side face of the holder such that the main arm is rotatable about the first main arm engagement member, and a second main arm engagement member provided at another end of the main arm for engagement with a second body engagement member provided at a second position of the body such that the main arm is slidable along the second body engagement member; and a subarm including a first subarm engagement member provided at one end of the subarm for engagement with a first body engagement member provided at a first position of the body such that the subarm is rotatable about the first subarm engagement member, and a second subarm engagement member provided at another end of the subarm for engagement with a second holder engagement member provided at a second position of the side face of the holder such that the subarm is slidable along the second holder engagement member.

The subarm is supported at a rotation center thereof so as to be rotatable with respect to a rotation center on the main arm. The first subarm engagement member is elastically deformed so that the first subarm engagement member is moved along a direction of a rotation center axis of the subarm so that the first subarm engagement member is disengaged from the first body engagement member. Thus, there is no need for keeping the holder in a suitable position between uppermost and lowermost positions of its moving range in order to assemble the holder with the body, thereby facilitating easy assembly.

Since the first subarm engagement member is not disengaged from the first body engagement member after the assembly, there is no need for covering a hole used for the assembly as is conventional, thereby reducing the number of parts used for the cassette loading device.

As described above, according to the present invention, it is possible to provide a cassette loading device which can be readily and easily assembled and which uses a small number of parts.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A cassette loading device, comprising:

a holder for retaining a cassette therein, the holder reciprocating between a first holder position for insertion of the cassette into the holder and a second holder position for loading the cassette into a body;

a main arm including: a first main arm engagement member provided at one end of the main arm for engagement with a first holder engagement member provided at a near side of a side face of the holder such that the main arm is rotatable about the first holder engagement member; and a second main arm engagement member provided at another end of the main arm for engagement with a second body engagement member provided at a far side of the body such that the main arm is slidable along the second body engagement member; and a subarm including: a first subarm engagement member provided at one end of the subarm for engagement with a first body engagement member provided at a near side of the body such that the subarm is rotatable about the first body engagement member; and a second subarm engagement member provided at another end of the subarm for engagement with a second holder engagement member provided at a far side of the side face of the holder such that the subarm is slidable along the second holder engagement member, the subarm being supported at a rotation center thereof so as to be rotatable with respect to a rotation center on the main arm, wherein the subarm is elastically deformable in a direction of a rotation center axis so that the first subarm engagement member is moved along the direction of a rotation center axis of the subarm and the first subarm engagement member to be disengaged from the first body engagement member, thereby making assembly and disassembly possible.

2. A cassette loading device according to claim 1, wherein the first body engagement member has an inclined surface along which the first subarm engagement member is slidable so as to elastically deform the subarm during partial engagement of the first subarm engagement member with the first body engagement member.

3. A cassette loading device according to claim 2, wherein the subarm further includes a guide member and the body further includes a slit for accommodating the guide member when the first subarm engagement member is at least partially engaged with the first body engagement member.

4. A cassette loading device according to claim 1, wherein the second body engagement member includes a first portion and a second portion, and the second main arm engagement member includes a flange, the diameter of the flange being larger than a width of the first portion of the second body engagement member and smaller than a diameter of the second portion of the second body engagement member.

* * * * *